United States Patent [19]
Rollhauser et al.

[11] Patent Number: 5,426,905
[45] Date of Patent: Jun. 27, 1995

[54] INSULATION ATTACHMENT STUD FOR COMPOSITE MATERIAL SUBSTRATE

[75] Inventors: Charles M. Rollhauser, Severna Park; Creig P. Beck, Church Hill, both of Md.

[73] Assignee: The United States of America as represented by the Secretary of the Navy, Washington, D.C.

[21] Appl. No.: 119,854

[22] Filed: Sep. 13, 1993

[51] Int. Cl.[6] .................................................. E04B 7/06
[52] U.S. Cl. ........................................ 52/512; 52/410; 411/396
[58] Field of Search ............... 52/410, 408, 409, 512, 52/513, 514; 411/396, 397, 384, 374, 371, 401, 506

[56] References Cited

U.S. PATENT DOCUMENTS

| | | | |
|---|---|---|---|
| 2,007,179 | 7/1935 | Ballis | 411/396 |
| 2,412,744 | 12/1946 | Nelson | 52/410 |
| 3,604,492 | 9/1971 | Bayer | 52/506.05 |
| 4,069,738 | 1/1978 | McClure | 85/70 |
| 4,592,688 | 6/1986 | Kramer | 411/349 |
| 4,597,702 | 7/1986 | Brown | 411/529 |
| 4,616,455 | 10/1986 | Hewison | 52/127.12 |
| 4,653,246 | 3/1987 | Hepler | 52/787 |
| 4,764,069 | 8/1988 | Peinwall et al. | 52/410 |
| 4,781,503 | 11/1988 | Bogel | 411/368 |
| 4,834,600 | 5/1989 | Lemke | 52/410 |
| 4,842,465 | 6/1989 | Pease et al. | 411/337 |
| 4,930,959 | 6/1990 | Jagelid | 411/389 |
| 4,932,819 | 6/1990 | Almeras | 52/410 |
| 4,978,350 | 12/1990 | Wagenknecht | 411/387 |
| 5,171,118 | 12/1992 | Rothenbuhler | 411/480 |
| 5,177,922 | 1/1993 | Ovaert et al. | 52/410 |

FOREIGN PATENT DOCUMENTS 3602389  7/1987  Germany ..................... 411/506

Primary Examiner—Carl D. Friedman
Assistant Examiner—Winnie Yip
Attorney, Agent, or Firm—Gary G. Borda

[57] ABSTRACT

The invention is directed to a stud and attachment assembly for securing individual studs to composite material substrates so that thermal or acoustic insulating materials may be attached to the substrate. An attachment stud for securing a layer of insulation material to an organic matrix composite substrate is provided which includes a mechanical attachment element for securing the attachment stud to the composite substrate and a stud element rigidly affixed to the attachment element for receiving the layer of insulation material.

2 Claims, 3 Drawing Sheets

INSULATION ATTACHMENT STUD FOR COMPOSITE MATERIAL SUBSTRATE

STATEMENT OF GOVERNMENT RIGHTS

The invention described herein may be manufactured and used by or for the Government of the United States of America for governmental purposes without the payment of any royalties thereon or therefor.

BACKGROUND OF THE INVENTION

1. Field of Invention

The present invention relates generally to insulation attachment studs and methods of attaching insulation to structures. More particularly, the invention relates to a stud and attachment assembly for securing individual studs to a composite material substrate so that thermal or acoustic insulating materials may be attached to the substrate.

2. Brief Description of Related Art

The Navy has studied the use of organic matrix composite materials, such as glass reinforced plastic (GRP), as structural components. Organic matrix composite materials exhibit high structural strength, resistance to the marine environment, and ease of manufacture. Thus it has been proposed that vinyl-ester and glass composites be employed as the structural material for an all composite deckhouse module.

However, the principal hindrances to the use of organic matrix composite materials as structural components are that exposure to increased temperatures reduce their strength and structural integrity and that close proximity exposure to high intensity heat sources can cause them to burn. In fact, Navy studies indicate that such composites are vulnerable to loss of strength at relatively low temperatures. Consequently, passive fire protection is required to protect organic composites from fire-related heat effects.

The Navy presently employs passive fire protection systems to protect metallic structural components on surface ships from fire. Passive fire protection systems are based on an insulation layer composed of mineral wool blankets with an outer sheet of fibrous glass cloth. Studs are welded, using a spot welding gun, to the metallic components and the insulation batts are impaled on the studs and held in place by steel retaining caps. However, there is no method available to weld metallic studs to organic composite materials. Thus there is a need for a means and method of attaching layers of insulation to organic matrix composite material structures in order to protect such structures from the detrimental effects of fire or other heat sources.

The Navy has studied a number of options for attaching fire protective thermal insulation to composite structures. Among the options considered are: embedding studs having enlarged bases within the composite; embedding nuts within the composite and inserting threaded studs into the nuts; embedding metal plates within the composite and using sheet metal screws to attach studs; drilling holes in the composite, installing threaded inserts in the holes and inserting threaded studs into the inserts; drilling through the composite and using through bolts to attach the studs; and either adhesively bonding the insulation layer directly to the composite or adhesively bonding a suitable baseplate having studs welded or otherwise bonded thereto directly to the composite.

However, all these proposals involve potential problems. Embedded systems would have to be installed during lay up of the composite material panels and, thus, would require that the panels be made with prior knowledge of the pattern and placement of insulation studs. Stud location is dependent on placement of insulation batts which is dependent on final placement of bulkheads and ancillary equipment, location of cable runs, and other factors involved in building a ship. Because proper stud location is very important to properly holding the insulation material in place, insulation batts have in the past been installed on an ad hoc basis. Changes in the ship's configuration or addition of bulkhead mounted equipment may require changing the location of insulation batts, thus, requiring alternative means of attaching the insulation in the field. Additionally, the composite panels must have sufficient thickness to securely hold the embedded elements. Currently, the Navy uses a vacuum bag process to produce composite panels. Including embedded studs in the manufacture process may cause holes in the bags and, thus, make manufacture of composite panels more difficult. Furthermore, the embedded elements and inserted studs must not over-penetrate and cause delamination of the composite layers.

Through bolts have a tendency to compress the composite material between the securing nuts and to increase the ship's radar cross-section due to the presence of bolt heads on the exterior of the deckhouse. Through holes may cause water leakage through exterior walls and bulkheads and could weaken the composite structure. Furthermore, through bolts can not be used in areas where both sides of the composite are not accessible.

Adhesive bonding requires an adhesive that is compatible with the composite material at normal and high temperatures and which will last the projected 30 to 50 year life of the ship. Presently, the Navy's passive fire protection insulation is based on a mineral wool blanket with an outer sheet of fibrous glass cloth. Directly adhering the insulation to the structure would require that the insulation be redesigned to accept adhesive on its inner surface. A compatible design would include a protective outer layer of fiberglass scrim, a mineral wool insulation, an additional inner layer of fiberglass scrim, and a quilt construction using high temperature threads to sew through the two fiberglass scrims. Adhesively bonding a base plate with attached stud directly to the structure would not require redesigning the insulation. However, recent tests indicate that adhesives may degenerate under heat load, especially near the limits of operation of the insulation.

To increase the high temperature bond strength of a system employing an adhesively bonded base plate with attached stud, it has been recommended to secure the base plate to the composite structure using two to four sheet metal screws in addition to an adhesive. This method would involve four operations: (1) laying out pilot holes for the screws; (2) drilling pilot holes; (3) applying glue to the base plate; and (4) positioning the base plate while driving the screws in place. While the non-embedded systems have the advantage of not necessitating a prior knowledge of required stud position, they are all very time and labor intensive since approximately three studs per square foot of surface area are required to hold the insulation in place.

OBJECTS OF THE INVENTION

Accordingly, it is an object of the present invention to provide an insulation attachment stud and system which can be quickly, easily, and cheaply installed in the field and will efficiently secure a layer of thermal or acoustic insulation material to an underlying organic matrix composite material substrate such as a composite deckhouse on a marine vehicle.

It is a further object of the present invention to provide an insulation attachment stud that can be install in approximately one-third the time it takes to install the presently recommended system.

It is still a further object of the present invention to provide a method of passive fire protection for organic matrix composite material substrates that is simpler, quicker, and more cost effective to implement than systems presently used or recommended in the Navy.

Other objects and advantages of the present invention will become apparent to those skilled in the art upon a reading of the following detailed description taken in conjunction with the drawings and the claims supported thereby.

SUMMARY OF THE INVENTION

In accordance with the present invention, (1) an attachment stud for securing a layer of insulation material to an organic matrix composite substrate, (2) a heat resistant organic matrix composite structural component, and (3) a method of passive fire protection for an organic matrix composite material substrate are provided. The specific embodiments of the present invention each employ an improved insulation attachment stud for composite material substrates.

The attachment stud for securing a layer of insulation material to an organic matrix composite substrate as taught by the present invention includes a mechanical attachment element for securing the attachment stud to the composite substrate and a stud element rigidly affixed to the attachment element for receiving the layer of insulation material. The attachment element is referred to as a "mechanical attachment element" to emphasize that the stud is mechanically attached to the composite substrate as opposed to being adhesively attached, as for example, by welding, gluing, bonding, or fusing.

The stud element of the attachment stud is an axially extending shaft having a first end with a base region adjacent thereto and a second end with a head region adjacent thereto. The head region is axially spaced from the base region by a shank region. Additionally, the shaft is adapted to cooperatively engage and hold a retaining means for retaining the layer of insulation material on the shaft.

The mechanical attachment element of the attachment stud includes an installing means affixed to the stud substantially at its base region and a securing means adjacent to the installing means. The securing means is affixed to the shaft substantially at its first end and is capable of penetrating the composite substrate in order to secure the attachment stud to the composite substrate. The installing means includes a driving head and an annular flat plate adjacent to the driving head. The flat plate is located between the driving head and the securing means and forms an abutment which acts to stop penetration of the mechanical attachment element. The driving head is shaped to cooperatively engage a driving tool. Thus, the driving head acts to cause the securing means to penetrate the composite substrate to a point where the abutment adjoins the composite substrate.

The attachment stud may further include a retaining means for retaining the layer of insulation material in place on the stud element. The retaining means includes a cap constructed to mate with the stud element substantially at its head region. The second end or head region of the shaft is adapted to mate with the cap. Once the cap is placed on the stud element, the layer of insulation material is held in place between the cap and the composite substrate.

The heat resistant composite structure of the present invention includes an underlying organic matrix composite material component which forms the composite structure, a thermal insulation layer for covering exposed surfaces of the composite structure, and an attachment assembly for securing the thermal insulation layer to the composite material component. The attachment assembly further includes an attachment element for securing the attachment assembly to the composite material component, a stud element rigidly affixed to the attachment element for receiving the thermal insulation layer, and a retaining means for retaining the thermal insulation layer in place on the stud element.

The stud element of the attachment assembly includes an axially extending shaft having a first end with a base region adjacent thereto and a second end with a head region adjacent thereto. The head region is axially spaced from the base region by a shank region.

The attachment element of the attachment assembly includes a self-drilling screw affixed to the shaft substantially at the first end for penetrating the composite material component, a driving head attached to the base region of the shaft, and an annular flat plate abutting the driving head. The flat plate is located between the driving head and the self-drilling screw to form an abutment which acts to stop penetration of the self-drilling screw into the composite structure. The driving head is shaped to cooperatively engage a driving tool for turning the attachment assembly. Thus, the driving head acts to cause the self-drilling screw to penetrate the composite material component such that the abutment adjoins the composite material component.

The retaining means of the attachment assembly includes a push on mushroom-shaped cap. The cap includes a large diameter head and a tubular body. The tubular body and the head region of the shaft are adapted to cooperatively engage each other and, thus, to retain the mushroom-shaped cap on the shaft.

The method of passive fire protection for an organic matrix composite material substrate as taught by the present invention includes the steps of providing a plurality of attachment studs, securing between 2 and 5 of the studs per square foot of surface area to the composite material substrate, impaling a layer of thermal insulation onto the studs, and installing a retaining cap on the head region of the shaft of each stud.

Attachment studs used in the present method include an axially extending shaft having a first end with a base region adjacent thereto and a second end with a head region adjacent thereto. The head region is shaped to accept a retaining cap. Each attachment stud also includes a self-drilling screw affixed to the shaft substantially at its first end for penetrating the substrate, a driving head attached to the base region of the shafts, and an annular flat plate abutting the driving head. The flat plate is located between the driving head and the self-drilling screw and forms an abutment which acts to stop penetration of the attachment stud. The driving head is shaped to cooperatively engage a driving tool for turning the stud. Thus, the driving head causes the self-drilling screw to penetrate the substrate such that the abutment adjoins the substrate.

BRIEF DESCRIPTION OF THE DRAWINGS

The foregoing objects and other advantages of the present invention will be more fully understood by reference to the following description taken in conjunction with the accompanying drawings wherein like reference numerals refer to like or corresponding element throughout and wherein.

DETAILED DESCRIPTION OF THE PREFERRED EMBODIMENT

Organic matrix composite materials such as fiber-reinforced plastic composite materials are being used to an increasing extent as structural materials to replace metals because of light weight, high structural strength, improved corrosion resistance, and reduced maintenance requirements. Examples of matrix resins used in such composites include polyesters, epoxy resins, phenolic resins, bismaleimides, and polyphenylene sulfides. Examples of reinforcing materials include glass fibers, carbon fibers, Kevlar fibers, and Spectra fibers.

Figure 1:
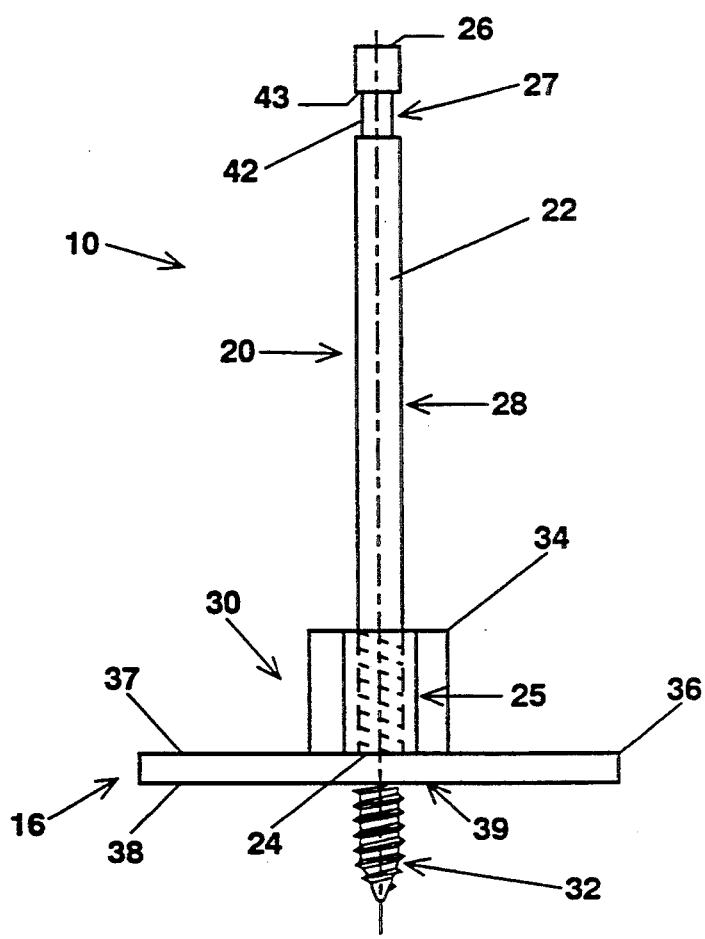
FIG. 1 is a side plan view of the attachment stud of the present invention.
Figure 2:
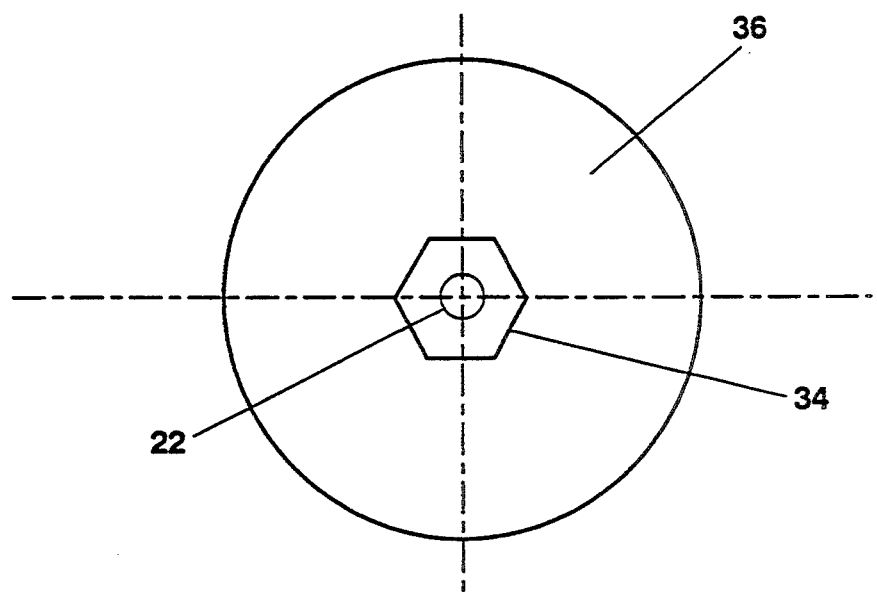
FIG. 2 is a top plan view of the attachment stud of the present invention.
Figure 3:
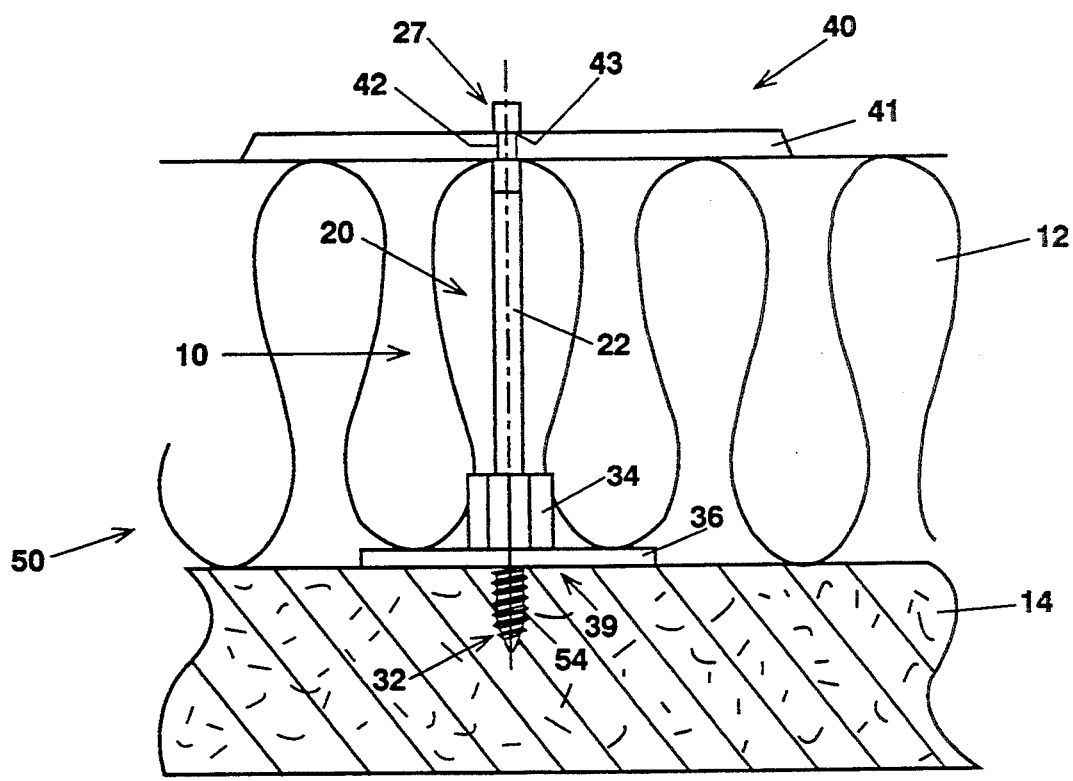
FIG. 3 is a side view, partially in section, of one embodiment of the present invention.
Figure 4:
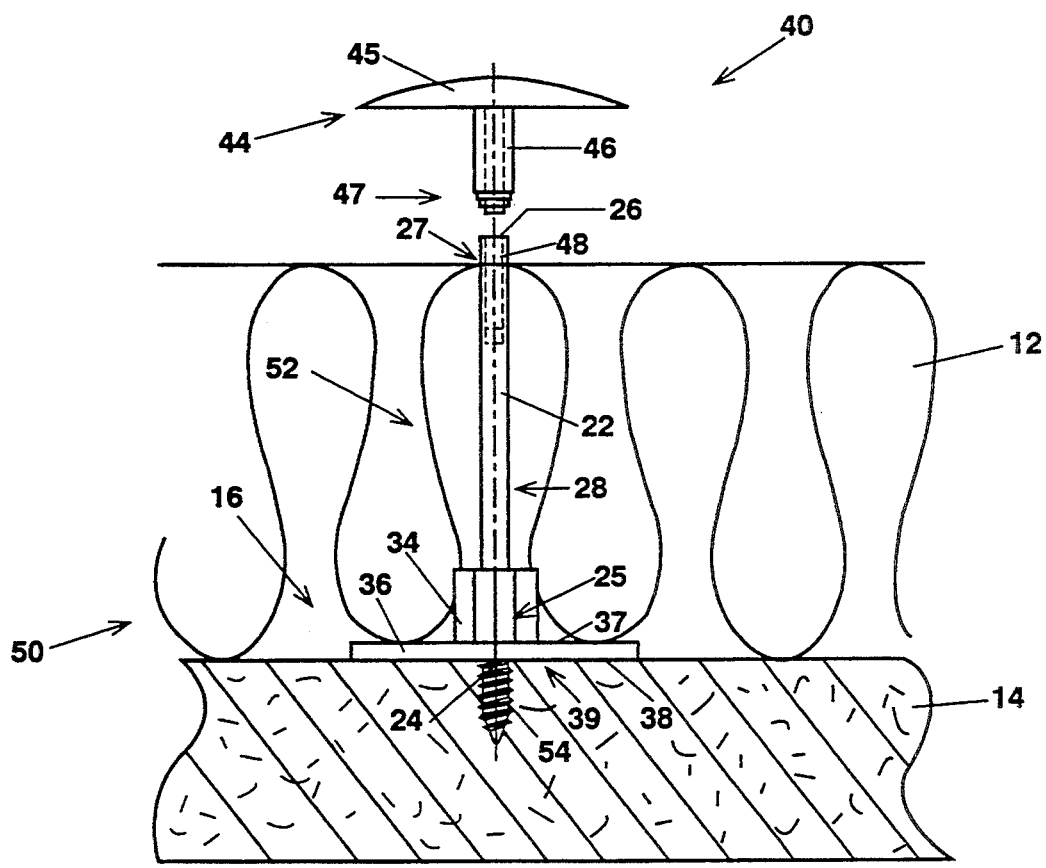
FIG. 4 is a side view, partially in section, of another embodiment of the present invention.

Referring to the drawings, and especially to FIGS. 1–2, attachment stud 10 of the present invention is intended for use in securing a layer of insulation material 12 to an organic matrix composite substrate 14 such as a glass reinforced plastic composite structures, e.g., a vinyl ester/glass composites, or the like (see FIGS. 3–4). Attachment stud 10 includes mechanical attachment element 16 for securing attachment stud 10 to composite substrate 14 and stud element 20 rigidly affixed to attachment element 16 for receiving layer of insulation material 12. Insulation materials associated with this invention will have suitable anechoic properties or thermal insulation properties. Thermal insulation batts, panels, or blankets are based on a layer of bulk insulation material such as fiberglass, mineral wool or the like and a thin outer protective layer such as a fibrous glass cloth. The present invention can be easily, quickly, and efficiently install on composite material structures where passive fire protection or sound insulation are desired.

As shown in FIG. 1, stud element 20 comprises axially extending shaft 22 having first end 24 and second end 26. Stud element 20 further includes base region 25 adjacent to first end 24 and head region 27 adjacent to second end 26. Head region 27 is axially spaced from base region 25 by shank region 28. Once installed, base region 25 will be proximate composite substrate 14 while head region 27 will be a free end which protrudes from composite substrate 14. Base region 25 may be threaded for receiving attachment element 16 when attachment element 16 is adapted to threadably engage shaft 22. Additionally, shaft 22 is adapted to cooperatively engage and hold a retaining means for retaining layer of insulation material 12 on shaft 22. Shaft 22 may be stainless steel or any other strong, heat resistant, corrosion resistant material. The length and diameter of shaft 22 are dictated by strength requirements, by material and installation considerations, and by the required thickness of the insulation layer. The length of shaft 22 should be substantially equal to the thickness of the insulation layer. Advantageously, shaft 22 is between ½ and 4 inches in length and between ⅛ and ½ inch in diameter. In a preferred embodiment, shaft 22 is made of 3/16 inch stainless steel wire cut to required lengths of between 1 and 4 inches.

As shown in FIGS. 1–2, mechanical attachment element 16, for securing attachment stud 10 to composite substrate 14, comprises installing means 30 and securing means 32. Installing means 30 is affixed to shaft 22 substantially at base region 25 in any manner suitable for rigidly attaching installing means 30 to shaft 22. Securing means 32 is located adjacent to installing means 30 and is affixed to shaft 22 substantially at first end 24 and/or to installing means 30 in any manner suitable for rigidly attaching securing means 32 to shaft 22 and/or installing means 30. The means for rigidly attaching include, but are not limited to, welding, threadably engaging as with a nut and bolt, or casting as a single contiguous piece.

Securing means 32 can be any suitable mechanism capable of penetrating composite substrate 14 and holding its position under load, such as a nail or a screw-threaded fastener, e.g., a wood screw or a machine screw. Preferably, securing means 32 is a self-drilling screw. However, if pilot holes are drilled at predetermined locations in composite substrate 14, securing means 32 can be a self-tapping screw. The size of securing means 32 is dictated by load requirements and by the thickness of composite substrate 14. Securing means 32 should not be so long as to pass completely through the underlying substrate and should not be so large or penetrate so deeply as to cause structural weakness or delamination of composite layers. Preferably, securing means 32 is between ¼ inch and ¾ inch in length.

Installing means 30, intended for use during installation of attachment stud 10 at predetermined locations of composite substrate 14, includes driving head 34 and annular flat plate 36. Driving head 34 is located adjacent to first end 24 of shaft 22 and substantially surrounds base region 25. Driving head 34 can be adapted to threadably engage base region 25 when base region 25 is threaded. Annular flat plate 36 abuts driving head 34 between driving head 34 and securing means 32. Flat plate 36 has a top surface 37 and a bottom surface 38 which extend transversely of the axial direction, radially outward from shaft 22. Bottom surface 38 forms abutment 39 which, during installation of attachment stud 10, acts as a stop for mechanical attachment element 16. Flat plate 36 helps to distribute the load acting on shaft 22 over an enlarged surface area of the composite substrate 14. Flat plate 36 is preferably a large diameter washer, i.e., a washer having a diameter of about one to ten times the diameter of driving head 34. Driving head 34 is shaped to cooperatively engage a driving tool. Driving head 34 can be any appropriately shaped tool head for engaging a tool, such as for example, flats on shaft 22 for mating with a wrench, but is preferable a nut for mating with a socket and is more preferably a hex nut. Driving head 34 is employed to turn attachment stud 10 whereby securing means 32 penetrates composite substrate 14 until abutment 39 adjoins composite substrate 14. When driving head 34 is a threaded nut, shaft 22 is threaded to engage the nut in the opposite rotational direction than that required to cause securing means 32 to penetrate composite substrate 14. That is, if a right-handed screw is used as securing means 32, base region 25 of shaft 22 will have left-handed thread so that turning the nut clockwise will both advance the screw into the composite substrate and tighten the nut on the shaft. By so doing, attachment stud 10 is secured to composite substrate 14.

As detailed in FIGS. 3-4, attachment stud 10 may include retaining means 40 for use in holding insulation material 12 in place between retaining means 40 and composite substrate 14 to which stud element 20 is affixed. Retaining means 40 is adapted for locking onto head region 27 of shaft 22 which is adapted to engage or mate with retaining means 40. Retaining means 40 can be, for example, a retaining cap, retaining washer, clip, annular disk, or other suitable locking device. Appropriate retaining caps include any of the well known self-locking variety of caps that are forced over the free end of the stud and grip the stud because of the resilient nature of the cap.

In one embodiment, as shown in FIG. 3, retaining means 40 includes large area annular disk 41, which is removably attachable to shaft 22, and at least one circumferential groove 42 in shaft 22 located substantially in head region 27 and defining step 43 for engaging and retaining disk 41. Groove 42 may be formed in shaft 22 by grinding, cutting, rolling or the like. The diameter of annular disk 41 is dictated by the load created by insulation layer 12 and should be large enough to retain the layer of insulation without tearing or damaging its outer surface.

In another embodiment, as shown in FIG. 4, retaining means 40 includes push-on mushroom-shaped cap 44 having large diameter head 45 and tubular body 46. Tubular body 44 and head region 27 of shaft 22 are adapted to cooperatively engage or mate with each other and thus retain mushroom-shaped cap 44 on shaft 22. In a further embodiment, tubular body 46 may having one or more axially oriented, concentric, annular lips 47 located on the end opposite large diameter head 45 and adapted to mate with one or more axially oriented, concentric, annular grooves 48 in second end 26 of shaft 22 adapted for engaging annular lips 47 and, thus, retaining mushroom-shaped cap 44 on shaft 22.

Referring to FIGS. 3-4, heat resistant composite structure 50 of the present invention comprises an underlying organic matrix composite material component 14 which forms composite structure 50, thermal insulation layer 12 for covering exposed surfaces of composite structure 50, and attachment assembly 52 for securing thermal insulation layer 12 to composite material component 14. In a preferred embodiment, organic matrix composite material component 14 is made of a glass reinforced plastic composite. In a more preferred embodiment, organic matrix composite material component 14 is made of a fiberglass reinforced vinyl ester composite.

Attachment assembly 52 further includes mechanical attachment element 16 for securing attachment assembly 52 to composite material component 14, stud element 20 rigidly affixed to attachment element 16 for receiving thermal insulation layer 12, and retaining means 40 for retaining thermal insulation layer 12 in place on stud element 20.

Stud element 20 comprises axially extending shaft 22 having first end 24 and second end 26. Stud element 20 further includes base region 25 adjacent to first end 24 and head region 27 adjacent to second end 26. Head region 27 is axially spaced from base region 25 by shank region 28. Additionally, shaft 22 is adapted to cooperatively engage and hold a retaining means for retaining layer of insulation material 12 on shaft 22. Shaft 22 may be stainless steel or any other strong, heat resistant, corrosion resistant material. Further, base region 25 may be threaded for receiving attachment element 16 when attachment element 16 is adapted to threadably engage shaft 22.

Attachment element 16 includes self-drilling screw 54 affixed to shaft 22 substantially at first end 24 for penetrating composite material component 14, driving head 34 attached to base region 25, and annular flat plate 36 abutting driving head 34 between driving head 34 and self-drilling screw 54. Flat plate 36 has a top surface 37 and a bottom surface 38 which extend transversely of the axial direction, radially outward from shaft 22. Bottom surface 38 forms abutment 39 which, during installation of attachment assembly 52, acts as a stop for attachment element 16.

Driving head 34 can be adapted to threadably engage base region 25 of shaft 22 when base region 25 is threaded. Driving head 34 is shaped to cooperatively engage a driving tool for turning the attachment assembly. Thus, driving head 34 is employed for turning self-drilling screw 54 whereby self-drilling screw 54 penetrates composite material component 14 until abutment 39 adjoins composite material component 14. By so doing, attachment assembly 52 is secured to composite material component 14.

Retaining means 40 includes push-on mushroom-shaped cap 44 which has a large diameter head 45 and a tubular body 46. Further, tubular body 46 and head region 27 of shaft 22 are adapted to cooperatively engage one another whereby mushroom-shaped cap 44 is retained on shaft 22.

The method of passive fire protection for an organic matrix composite material substrate, as taught by the present invention, includes the steps of providing a plurality of attachment studs 10, securing between 2 and 5 attachment studs 10 per square foot of surface area to said composite material substrate 14, impaling a layer of thermal insulation onto attachment studs 10, and installing retaining means 40 on each of said attachment studs 10.

Each attachment stud 10 includes axially extending shaft 22 having first end 24 with base region 25 adjacent thereto and second end 26 with head region 27, which is shaped to accept a retaining cap, adjacent thereto, self-drilling screw 54 affixed to shaft 22 substantially at first end 24 for penetrating substrate 14, driving head 34 attached to base region 25, and annular flat plate 36 abutting driving head 34 between driving head 34 and self-drilling screw 54.

Flat plate 36 has top surface 37 and bottom surface 38 which extend transversely of the axial direction, radially outward from shaft 22. Bottom surface 38 forms abutment 39 which acts as a stop during installation of attachment studs 10. Further, driving head 34 is so shaped as to cooperatively engage a driving tool for turning self-drilling screw 54 and, thus, for causing self-drilling screw 54 to penetrate substrate 14 such that said abutment 39 adjoins substrate 14.

In a preferred embodiment, the securing step includes securing 3 attachment studs 10 per square foot to composite material substrate 14. Additionally, prior to the securing step self-drilling screws 54 can be coated with a suitable high-temperature adhesive, i.e., one that is compatible with the composite material, does not loose adhesion at elevated temperatures, and has a long effective life.

The invention described herein is intended for mounting insulation on composite structures, such as for example, on the walls or ceilings of a composite deckhouse of a ship. In operation, appropriate locations for the attachment studs are determined and are either marked or a pilot hole is drilled. A stud is inserted into a driving tool with the driving head engaging the tool head and is mechanically attached to the composite structure. Studs are secured to the structure in a spaced relationship at between 2 and 5 studs per square foot of surface area. Preferably, three studs per square feet are secured to the substrate. The driving head of the installing means is utilized to turn the securing means whereby the securing means penetrates the composite structure until the abutment formed by the flat plate contacts the structure. The flat plate serves two purposes. First, because over-penetration by the securing means can cause delamination of composite layers, it provides a stop for penetration of the securing means. Second, once the flat plate abuts the structure, appropriate additional turns of the stud create a tension force between the securing means and the composite structure that acts as a locking force such as provided by a lock-washer. The panels, batts, or blankets of insulation material are then positioned on the substrate by impaling them onto the protruding shafts of the studs. A retaining means is then positioned on the free end of the stud in order that the insulation is maintained in place.

The advantages of the present invention are numerous. The invention will provide a simple, efficient, time and cost effective means to install thermal or acoustic insulation to organic composite material structures where welding of studs to the structure is not possible. The number of operations required to install each stud, the number of securing means per surface area of substrate, and the time and cost to install a passive fire protection system on an organic composite material structure are all considerably reduced. The invention is easily installed in the field to finished structures without the need for prior knowledge of required insulation locations. The invention provides a very strong attachment stud design, a stronger high temperature attachment between stud and composite substrate than adhesive bonding, and will not create stress concentrations or cause water leakage as would attachment systems based on through bolts.

The present invention and many of its attendant advantages will be understood from the foregoing description and it will be apparent to those skilled in the art to which the invention relates that various modifications may be made in the form, construction and arrangement of the elements of the invention described herein without departing from the spirit and scope of the invention or sacrificing all of its material advantages. The forms of the present invention herein described are not intended to be limiting but are merely preferred or exemplary embodiments thereof.

What is claimed is:

1. An attachment stud for securing a layer of insulation material to a glass reinforced plastic substrate, comprising:

a mechanical attachment element for securing said attachment stud to said glass reinforced plastic substrate;

a stud element rigidly affixed to said attachment element or receiving said layer of insulation material; and a retaining means for retaining said layer of insulation material on said stud element;

wherein said stud element includes an axially extending stainless steel shaft having a first end with a threaded base region adjacent thereto and a second end with a head region adjacent thereto, said head region being axially spaced from said base region by a shank region, said head region and said shank region being unthreaded, said shaft being between $\frac{1}{2}$ inch and 4 inches in length and between $\frac{1}{8}$ inch and $\frac{1}{2}$ inch in diameter;

wherein said mechanical attachment element includes an installing means removably affixed to said shaft and a self-drilling screw rigidly attached to said installing means opposite said shaft, said self-drilling screw being between $\frac{1}{4}$ inch and $\frac{3}{4}$ inch in length, said self-drilling screw functioning to penetrate said glass reinforced plastic substrate whereby said attachment stud is secured to said glass reinforced plastic substrate, said installing means adapted for installing said attachment stud at a predetermined location of said glass reinforced plastic substrate, said installing means removably affixed to said shaft substantially at said base region, said installing means including a hex nut for threadably engaging said threaded base region of said shaft such that said stud element is removably affixed to said mechanical attachment element, said hex nut functioning to cooperatively engage a driving tool for urging said self-drilling screw to penetrate said glass reinforced plastic substrate, said installing means further including an annular flat washer between said hex nut and said said self-drilling screw, said washer having top and bottom surfaces wherein said top surface is rigidly attached to said hex nut and said bottom surface is rigidly attached to said self-drilling screw, said washer having a diameter equal to about two to about ten times a maximum transverse dimension of said hex nut, said top and bottom surfaces extending radially from said shaft, said bottom surface forming an abutment functioning to stop said penetration of said self-drilling screw and further functioning to distribute a load acting on said shaft over an enlarged area of said glass reinforced plastic substrate equal to an area of said bottom surface; and wherein said retaining means includes a large area annular disk removably attachable to said shaft and at least one circumferential groove in said shaft located substantially in said head region and defining a step for cooperatively engaging and retaining said disk.

2. A heat resistant composite structure, comprising:

an underlying glass reinforced plastic component forming said composite structure;

a thermal insulation layer for covering an exposed surface of said glass reinforced plastic component; and an attachment assembly for securing said thermal insulation layer to said glass reinforced plastic component, said attachment assembly further comprises a mechanical attachment element for securing said attachment assembly to said glass reinforced plastic component, a stud element rigidly affixed to said attachment element for receiving said thermal insulation layer, and a retaining means for retaining said thermal insulation layer in place on said stud element, wherein said stud element includes an axially extending stainless steel shaft having a first end with a threaded base region adjacent thereto and a second end with a head region adjacent thereto, said head region being axially spaced from said base region by a shank region, said head region and said shank region being unthreaded, said shaft being between ⅛ inch and 4 inches in length and between ⅛ inch and ½ inch in diameter, wherein said mechanical attachment element includes a self-drilling screw for penetrating said glass reinforced plastic component, said self-drilling screw being between ¼ inch and ¾ inch in length, a hex nut for threadably engaging said threaded base region of said shaft whereby said stud element is removably attached to said mechanical attachment element, and an annular flat washer located between said hex nut and said self-drilling screw, said washer having top and bottom surfaces wherein said top surface is rigidly attached to said hex nut and said bottom surface is rigidly attached to said self-drilling screw, said washer having a diameter equal to about two to about ten times a diameter of said hex nut, said top and bottom surfaces extending transversely outward from said shaft, said bottom surface forming an abutment, said hex nut functioning to cooperatively engage a driving tool for urging said self-drilling screw to penetrate said glass reinforced plastic component such that said abutment adjoins said glass reinforced plastic component, said abutment functioning to stop said penetration of said self-drilling screw and further functioning to distribute a load acting on said shaft over an enlarged area of said glass reinforced plastic component equal to an area of said bottom surface, and wherein said retaining means includes a large area annular disk removably attachable to said shaft and at least one circumferential groove in said shaft located substantially in said head region and defining a step for engaging and retaining said disk.

* * * * *